(12) United States Patent
Kring et al.

(10) Patent No.: US 7,407,221 B2
(45) Date of Patent: Aug. 5, 2008

(54) SUPPORT STRUCTURES USING TUBES HAVING VARIABLE WALL THICKNESSES

(75) Inventors: James Kring, Luna Pier, MI (US); Gene Goins, Canton, MI (US); Dean Richardson, Blissfield, MI (US)

(73) Assignee: L&W Engineering Incorporated, Belleville, MI (US)

( * ) Notice: Subject to any disclaimer, the term of this patent is extended or adjusted under 35 U.S.C. 154(b) by 215 days.

(21) Appl. No.: 10/997,808

(22) Filed: Nov. 24, 2004

(65) Prior Publication Data

US 2005/0134090 A1   Jun. 23, 2005

Related U.S. Application Data

(60) Provisional application No. 60/524,497, filed on Nov. 24, 2003.

(51) Int. Cl.
*B62D 25/14* (2006.01)
(52) U.S. Cl. .................... 296/193.02; 296/70
(58) Field of Classification Search ............ 296/193.02, 296/70
See application file for complete search history.

(56) References Cited

U.S. PATENT DOCUMENTS 4,616,500 A    10/1986  Alexoff
4,722,216 A  *  2/1988  Fencl ........................... 72/402
5,238,286 A  *  8/1993  Tanaka et al. ................. 296/70
5,255,487 A  * 10/1993  Wieting et al. ............. 52/735.1
5,522,246 A     6/1996  Simon
5,566,777 A  * 10/1996  Trommer et al. ............ 180/232
6,391,470 B1    5/2002  Schmieder et al.
6,406,088 B1 *  6/2002  Tate ...................... 296/187.03
6,439,672 B1    8/2002  Simon
6,554,352 B2 *  4/2003  Nagy ..................... 296/203.02
6,588,830 B1 *  7/2003  Schmidt et al. ........ 296/187.09
6,893,078 B2 *  5/2005  Saeki .................... 296/187.09

FOREIGN PATENT DOCUMENTS

JP    5293535    11/1993
JP    3736865    1/2006

OTHER PUBLICATIONS

English abstract provided for JP-5293535.
Certified English translation provided for JP-3736865.

* cited by examiner

*Primary Examiner*—Dennis H Pedder
(74) *Attorney, Agent, or Firm*—Rader, Fishman & Grauer PLLC

(57) ABSTRACT

A support structure for components within a vehicle is provided. The support structure includes a beam comprising a hollow metal tube coupled to vehicle's body. The tube is constructed of a single piece of tubing having first and second portions. The first portion has a first diameter and a first thickness, the second portion has a second diameter and a second thickness. The second diameter is larger than the first diameter and the second thickness is greater than the first thickness.

18 Claims, 3 Drawing Sheets

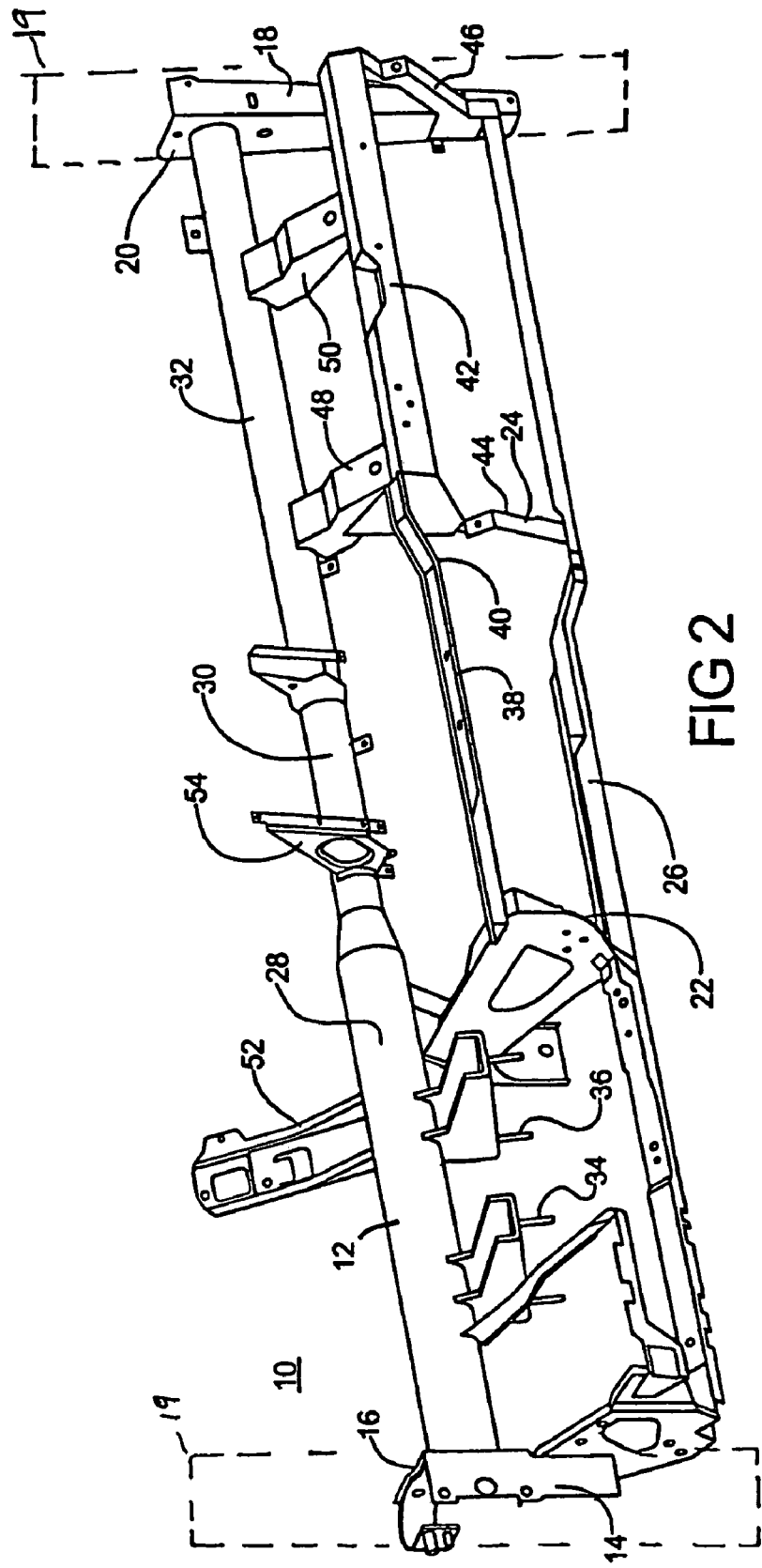

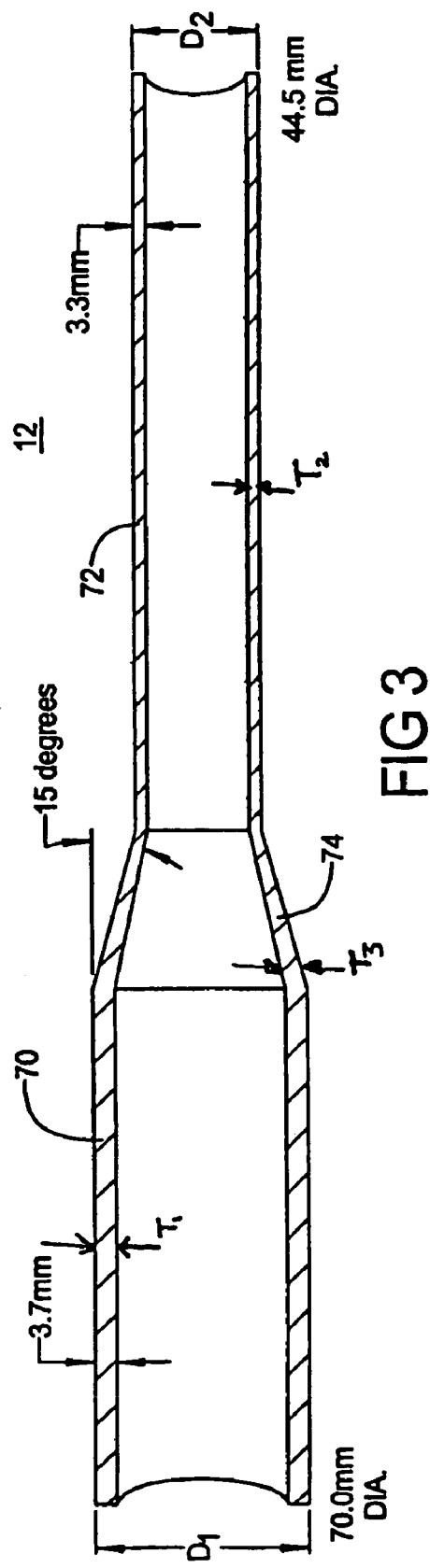

ated rearward of an engine compartment and forward of a passenger compartment and proximate a cowl structure where the lower edge of a windshield joins the vehicle frame. The support structures 10 are an example of a structure configured to support components within a movable platform such as an automobile or an aircraft.

SUPPORT STRUCTURES USING TUBES HAVING VARIABLE WALL THICKNESSES

CROSS-REFERENCE TO RELATED APPLICATIONS

This application claims the benefit of U.S. Provisional Application No. 60/524,497, filed on Nov. 24, 2003. The disclosure of the above application is incorporated herein by reference.

FIELD OF THE INVENTION

The present invention relates to structures to support components within a vehicle and more particularly to structures to support interior trim components within a vehicle's passenger compartment.

BACKGROUND OF THE INVENTION

Many automotive vehicle bodies have a frame with a pair of vertical pillars on the opposite sides of the vehicle body at the juncture of an engine compartment and a passenger compartment. The pillars are connected by a crossbeam structure at the cowl of the vehicle body forward of an instrument panel. The cross beam structure provides cross car stiffness, assist in managing front and side load impacts and supports the steering column and air bags. As well, the cross beam structure provides support for the dashboard, glove compartment and various instrument clusters. The cross beam structure must have sufficient strength to absorb loading applied to the steering column and forces associated with deployment of driver and/or passenger air bags.

Traditionally, cross-car beams are formed of various flat and tubular structures which are welded together. Each of these structures provide either support for various vehicle interior components or function to couple the cross car beam to the vehicles body. Theses previously known cross car support structures suffer the disadvantages that they are composed of multiple metal structures which are fastened together via multiple weld joints. Each of these weld joints and individual components increase the overall complexity of the structures as well as significantly increases the cost of maintaining dimensional stability. Further, the normal methodology of forming a cross-car beam leaves it difficult to estimate the strength of the structure in dynamic vehicle events.

SUMMARY OF THE INVENTION

It is an object of the present invention to provide support structures for vehicle components which overcome the disadvantages of the prior art. To at least partially overcome these disadvantages of previously known devices, the present invention provides a support structure including a beam comprising a hollow metal tube coupled to vehicle's body. The tube comprises a single piece tubing having at least two portions with varying diameters, each portion having varying thicknesses.

In another embodiment of the invention, a support structure including a beam comprising a hollow metal tube coupled to vehicle's body is provided. The tube is constructed of a single piece of tubing having first and second portions. The first portion has a first diameter and a first thickness, the second portion has a second diameter and a second thickness. The second diameter is larger than the first diameter and the second thickness is greater than the first thickness.

In another embodiment of the invention, a cross car structure member including a beam comprising a hollow metal tube extending across the vehicle between the vehicle pillars. The tube is constructed of a single piece of tubing having at least two portions with varying diameters, each portion having varying thicknesses.

In another embodiment of the invention, a cross car structure member including a beam comprising a hollow metal tube extending across the vehicle between the vehicle pillars is provided. The tube is constructed of a single piece of tubing having first and second portions. The first portion has a first diameter and a first thickness, the second portion has a second diameter and a second thickness. The second diameter is larger than the first diameter and the second thickness is greater than the first thickness.

In another embodiment of the invention, a support structure for supporting an engine within a vehicle is provided. The support structure includes a beam comprising a hollow metal tube coupled to the vehicle body. The tube is constructed of a single piece of tubing having at least two portions with varying diameters, each portion having varying thicknesses.

In another embodiment of the invention, a support structure constructed of a single piece of tubing having first and second portions for supporting an engine within a vehicle is provided. The first portion has a first diameter and a first thickness, the second portion has a second diameter and a second thickness. The second diameter is larger than the first diameter and the second thickness is greater than the first thickness.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 represents an alternate support structure for components within a vehicle; and FIG. 3 is a pictorial view of a section of the primary beam in the structure of FIG. 1.

DETAILED DESCRIPTION OF THE PREFERRED EMBODIMENTS

Figure 1:
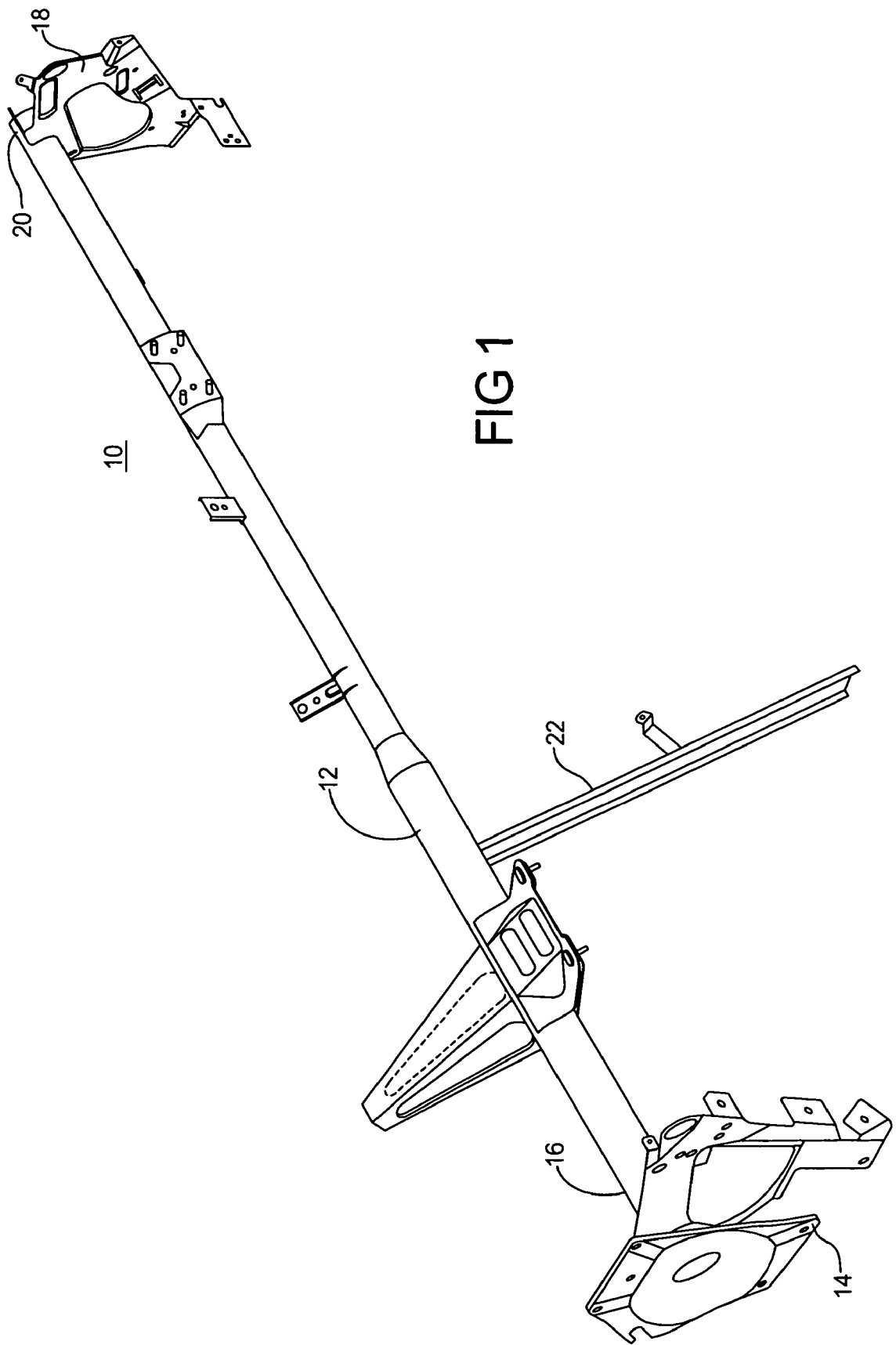
FIG. 1 is a pictorial view of a preferred embodiment of a cross car support structure in accordance with a first embodiment of the present invention.

The following description of the preferred embodiments is merely exemplary in nature and is in no way intended to limit the invention, its application, or uses.

Reference is made generally to FIGS. 1 and 2 which are a schematic pictorial view of a cross car support structures 10 of the present invention. The support structures are configured to span between left and right side vertical pillars of a vehicle frame such that the structures 10 are disposed rearward of an engine compartment and forward of a passenger compartment and proximate a cowl structure where the lower edge of a windshield joins the vehicle frame. The support structures 10 are an example of a structure configured to support components within a movable platform such as an automobile or an aircraft.

Shown is a pictorial view of a cross car support structure 10 in accordance with the present invention including a primary cross beam 12 which extends between a left-hand vertical end bracket member 14 at a left-hand end 16 of the beam 12 and a right hand vehicle end bracket member 18 at the right hand end 20 of the beam 12. As is known, the structure 10 is adapted to span between left and right side vertical pillars 19 on opposite sides of the frame, a vehicle body with the primary beam member 12 proximate the cowl of the vehicle, below and forward of a dashboard (not shown) and an instrument panel (not shown) and at a height below that of the windshield.

The structure 10 further can optionally include left hand intermediate vertical bracket member 22 which is spaced longitudinally along the beam 12 in between the end bracket members 14 and 16 and extending generally vertically downwardly from the primary beam member 12.

As shown in FIG. 2, an optional secondary cross beam member 26 can be provided extending generally parallel the primary beam member 12 spaced downwardly therefrom and also joining the end bracket members 14 and 18 and the intermediate bracket members 22 and 24. The primary cross beam member 12 is comprised of single unitary sections which are divided into a left section 28, a centre section 30 and a right section 32. The sections 28, 30 and 32 each have different diameters and, as explained below, different thicknesses. The secondary cross beam member 26 spans between the end vertical bracket member 14 and the end vertical bracket member 16 at the lower ends thereof spaced from the primary beam 12 extending to pass between the lower ends of the intermediate bracket members 18 and 20.

The support structure 10 is adapted to support a steering wheel column (not shown) and, in this regard, the primary beam 12 carries a left steering wheel column lower support bracket 34. As is to be appreciated, the brackets 34 and 36 can be utilized to securely support a steering wheel column to the primary beam 12.

To support the centre of a dashboard deck (not shown), a dashboard deck upper support assembly 38 is provided including a generally horizontally extending deck plate 40 supported by the two vertical brackets 22 and 24.

To support a glove compartment tray and door, a glove compartment support assembly is provided comprising an upper horizontal frame member 42 and two vertical side frame members 44 and 46. The horizontal frame member 42 is coupled to the primary beam 12 by brackets 48 and 50. The vertical side frame members 44 and 46 are connected at their top to the horizontal frame member 42 and at their bottoms to the secondary beam member 22.

To connect the support structure 10 as, for example, to a bulkhead between the engine compartment and the passenger compartment, connection brackets are provided. These connection brackets are shown as forward connection brackets 52 which are coupled at their rear end to the primary beam 12 and extend forwardly thereof.

Various brackets may be provided, for example, to support the dashboard and instrument cluster and a dashboard right connection bracket 54 is shown coupled to the primary beam member 12.

Reference is made to FIG. 3 which shows a portion of the primary cross beam 12 having the tube 12. The tube 12 is constructed of a single piece of tubing having at least two portions with different diameters, and having different thicknesses. As can be seen, the first portion 70 of the beam 12 has a first diameter D1 and a first thickness T1, the second portion 72 has a second diameter D2 and a second thickness T2. The second diameter is smaller than the first diameter D1 and the second thickness T2 is less than the first thickness T1. This will allow designers and engineers to construct a member having thicker in areas with high stress and thinner in areas where design can be optimized for weight savings. It is envisioned that the thicknesses $T_1$ and $T_2$ can be between 0.7 mm and 3.5 mm. As shown, the tube can have a tapered transition portion 74 having its own thickness $T_3$, which varies between $T_1$ and $T_2$. The tapered transition portion 74 is angled between about 20 and 10 degrees, and preferably about 15 degrees.

The primary beam 12 extends as a continuous hollow tube of varying cross-section from its left-hand end 54 to its right-hand end 55. The primary beam 12 comprises a hollow beam having varying circular cross-section which extends longitudinally throughout the length of the beam. It is also to be appreciated that the exterior diameter of the beam 12 can be held constant through the first and second portions 70 and 72, while allowing the thickness $T_1$ and $T_2$ to vary.

The primary beam 12 is preferably formed from metal by an extrusion/forming process. In this regard, the primary beam 12 is preferably formed using a system similar to that described in U.S. Pat. No. 4,616,500 herein incorporated by reference. After discharge from this process, the beam 12 may be deformed to assume a curved or bent shape. Additionally, it is envisioned that the primary beam 12 can have a constant outer radius with a varying thickness along its length.

The various bracket members which are coupled to the primary beam 12 and the secondary beam member 22 are preferably formed from metal sheeting forming into generally T-shape, L-shape, I-shape or U-shape configurations to provide enhanced rigidity. Preferably, the various bracket members will also comprise metal. Preferably, the metal of the bracket members and the secondary cross beam member 22 is substantially the same metal as that utilized for the primary beam 12. More preferably, such metal is HSLA 50 or mild steel such as grade 1010 steel, aluminum, or aluminum alloys. Preferably, the junctures between the primary beam and the various bracket members and secondary beam member 22, are junctures whereby the metal is welded or otherwise fused together to provide enhanced strength and rigidity and particularly without the need for mechanical fasteners.

In manufacturing the entire cross car support structure 10 as shown in FIGS. 1 and 2, it is envisioned that the cross car structure 10 is of the same or substantially the same metal of the brackets. These brackets are welded, braised, fused or suitably soldered together as integral unit provides a lightweight structure with enhanced rigidity and strength characteristics developed having regard to the particular structure and construction of each of the various components.

The preferred primary cross beam 12 shown has a cross-section which is shown to be circular. A circular cross-section is believed advantageous for enhanced strength and vibration reduction. It is however possible to provide the primary beam 12 with flat side surfaces to assist in the mating of surfaces of the various bracket members to the side surfaces of the primary beam. Further, by having beam portions having a larger diameter and larger thickness, support of more massive structures is possible.

The preferred primary beam 12 is shown to have a longitudinal centre axis provided at the geometric centre of its central passageway. It is to be appreciated that with the preferred embodiment, the longitudinal centre axis is linear over the right hand portion of the beam 12 and is optionally curved in one plane and linear in a second plane over the left-hand portion of the beam 12. It is therefore possible to provide tubing having a reduced thickness in areas which need to be bent. It is to be appreciated that the longitudinal centre of the primary beam member could be linear over its entire length, or could be curved and non-linear over its entire length. The particular adaptation of the primary beam member so as to be curved or linear does not significantly effect or alter the characteristics of the cross car support structure 10, however, it is believed preferred to have an arched configuration of the primary beam member which arches-upwardly from one side pillar over the location of the steering wheel column and then downwardly to approximately the centre of the primary beam member. This arching is believed to provide for enhanced resiliency to side impact loading.

While the invention has been described with reference to a preferred embodiment, the invention is not so limited. For a definition of the invention, reference is made to the following claims. The description of the invention is merely exemplary in nature and, thus, variations that do not depart from the gist of the invention are intended to be within the scope of the invention. For example, while the invention is described by general reference to a support structure for an instrument panel with a vehicle passenger compartment, it is equally envisioned that the variable thickness can be used to support other structures such as engine or transmission components. Further, these support tubes can be strategically located to deform and absorb energy both inside and outside a passenger compartment. Such variations are not to be regarded as a departure from the spirit and scope of the invention.

What is claimed is:

1. A cross vehicle structure member for a vehicle extending across the vehicle between the vehicle pillars comprising:
    a beam comprising a hollow metal tube extending across the vehicle between the vehicle pillars, the tube is constructed of a single monolithic piece of tubing having a first portion, coupled to a first side of the vehicle and having a first outer diameter, a first inner diameter and a first thickness;
    a second portion, coupled to a second side of the vehicle and having a second outer diameter, second inner diameter and a second thickness, said first inner diameter and outer diameter being smaller than the second inner diameter and outer diameter;
    a secondary cross beam member extending generally parallel the primary cross beam member and having generally the same length as the primary cross beam member;
    at least one structure supporting bracket secured between the primary cross beam and the secondary cross beam; and
    at least one second bracket configured to support a steering column coupled to the second portion.

2. The cross vehicle structure according to claim 1 wherein said beam further comprises a plurality of structure supporting brackets.

3. The cross vehicle structure according to claim 1 wherein the beam comprises a plurality of third brackets configured to support a knee bolster.

4. The cross vehicle structure according to claim 1 wherein the first and second thickness are between 0.7 mm and about 3.5 mm.

5. The cross vehicle structure according to claim 1 further comprising a plurality of sheet metal support brackets.

6. The cross vehicle structure according to claim 1 wherein said beam is formed of a metal selected from the group consisting of HSLA 50, mild steel, aluminum, or aluminum alloys.

7. A cross vehicle structural member comprising:
    a primary cross beam member including a beam comprising a hollow monolithic metal tube extending substantially between two interior surfaces of the vehicle, the tube being constructed of a single piece of tubing having first and second portions, the first portion, coupled to a first side of a vehicle and having a first inner diameter and a first thickness, the second portion, coupled to a second side of the vehicle and having a second inner diameter and a second thickness, the second inner diameter is greater than the first inner diameter and the second thickness is greater than the first thickness;
    a secondary cross beam member extending generally parallel the primary cross beam member and having generally the same length as the primary cross beam member;
    a plurality of brackets secured between the primary cross beam and the secondary cross beam including a first bracket secured at a first end of said primary cross beam member and a first end of said secondary cross beam member and a second bracket secured at a second end of said primary cross beam member and a second end of said secondary cross beam member; and
    a bracket configured to support a steering column coupled to the second portion.

8. The cross vehicle structure according to claim 7, the to plurality of brackets being formed of sheet metal and having a cross sectional shape selected from the group consisting of T-shape, L-shape, I-shape, and U-shape.

9. A support structure for supporting an instrument panel within a vehicle comprising:
    a primary cross beam member including a hollow metal tube coupled to the vehicle body, the tube being constructed of a single monolithic piece of tubing having a first portion, coupled to a first side of the vehicle and having first inner and outer diameters and a first thickness and a second portion, coupled to a second side of the vehicle and having a cylindrical outer surface and second outer and inner diameters and a second thickness, said first thickness being smaller than the second thickness;
    a secondary cross beam member extending generally parallel the primary cross beam member and having generally the same length as the primary cross beam member;
    at least one bracket secured between the primary cross beam member and the secondary cross beam member;
    a plurality of instrument panel supporting brackets welded to the hollow metal tube; and
    a steering column support bracket welded to the cylindrical outer surface.

10. The support structure for supporting an instrument panel according to claim 9 wherein the second inner diameter is larger than the first inner diameter.

11. The support structure for supporting an instrument panel according to claim 10 wherein the hollow metal tube is formed of a metal selected from the group consisting of HSLA 50, mild steel, grade 1010 steel, aluminum, and aluminum alloys.

12. A support structure for supporting a component within a vehicle comprising:
    a primary cross beam member including a single piece of tubing having first and second portions for supporting the vehicle component, the first portion has a first outer diameter and a first thickness, the second portion has a second inner diameter and a second thickness, the second inner diameter is larger than the first outer diameter and the second thickness is greater than the first thickness;
    a secondary cross beam member extending generally parallel the primary cross beam member and having generally the same length as the primary cross beam member;
    a plurality of brackets disposed between the primary cross beam member and the secondary cross beam member and welded to the tubing, at least a subset of said brackets configured to be coupled to the vehicle component.

13. The cross vehicle structural member according to claim 7 including at least a third bracket and a fourth bracket each positioned inwardly of the first bracket and the second bracket, a third member secured between the third bracket and the fourth bracket.

14. The cross vehicle structural member according to claim 13 wherein the third member is a dashboard deck plate.

15. The cross vehicle structural member according to claim 13, wherein a fourth member is secured at a first end using one of the third bracket and the fourth bracket and at a second end using one of the first bracket and the second bracket.

16. The cross vehicle structural member according to claim 15, wherein a frame member is disposed between the second end of the fourth member and one of the first bracket and the second bracket.

17. The cross vehicle structural member according to claim 16, wherein a supplemental bracket is secured between the primary cross beam and the fourth member.

18. The cross vehicle structural member according to claim 7, further comprising:
- a third bracket positioned between the first bracket and the second bracket;
- a fourth bracket positioned between the first bracket and the second bracket;
- a third member comprising a dashboard deck plate secured at a first end to the third bracket and at a second end to the fourth bracket; and
- a fourth member secured at a first end using one of the third bracket and the fourth bracket and at a second end using one of the first bracket and the second bracket.

* * * * *